US00RE47915E

(19) United States
(12) Reissued Patent
Akana et al.

(10) Patent Number: US RE47,915 E
(45) Date of Reissued Patent: Mar. 24, 2020

(54) EARPHONE

(71) Applicant: Apple Inc., Cupertino, CA (US)

(72) Inventors: Jody Akana, San Francisco, CA (US); Bartley K. Andre, Palo Alto, CA (US); Jeremy Bataillou, San Francisco, CA (US); Daniel J. Coster, San Francisco, CA (US); Daniele De Iuliis, San Francisco, CA (US); M. Evans Hankey, San Francisco, CA (US); Julian Hoenig, San Francisco, CA (US); Richard P. Howarth, San Francisco, CA (US); Jonathan P. Ive, San Francisco, CA (US); Duncan Robert Kerr, San Francisco, CA (US); Shin Nishibori, Kailua, HI (US); Matthew Dean Rohrbach, San Francisco, CA (US); Peter Russell-Clarke, San Francisco, CA (US); Christopher J. Stringer, Woodside, CA (US); Eugene Antony Whang, San Francisco, CA (US); Rico Zörkendörfer, San Francisco, CA (US); Hwang-Miaw Chen, Tu-Cheng (TW)

(73) Assignee: Apple Inc., Cupertino, CA (US)

(21) Appl. No.: 29/678,501

(22) Filed: Jan. 29, 2019

Related U.S. Patent Documents

Reissue of:
(64) Patent No.: Des. 652,823
Issued: Jan. 24, 2012
Appl. No.: 29/389,697
Filed: Apr. 15, 2011

(51) LOC (12) Cl. ..... 14-01
(52) U.S. Cl.
USPC ..... D14/223
(58) Field of Classification Search
USPC ..... D14/138 R, 172, 188, 191, 192, 203.1, D14/204, 205, 206, 223, 224, 225, 249, D14/372, 433, 496; D24/174
(Continued)

(56) References Cited

U.S. PATENT DOCUMENTS 3,934,100 A * 1/1976 Harada ..... A61B 7/00 181/135
D278,234 S * 4/1985 Saito ..... D14/205
(Continued)

*Primary Examiner* — Darlington Ly
(74) *Attorney, Agent, or Firm* — Sterne, Kessler, Goldstein & Fox P.L.L.C.

(57) CLAIM

The ornamental design for an earphone, as shown and described.

DESCRIPTION

FIG. 1 is a perspective view of an embodiment of an earphone showing my new design.
FIG. 2 is a front elevational view of the earphone of FIG. 1.
FIG. 3 is a rear elevational view of the earphone of FIG. 1.
FIG. 4 is a left side elevational view of the earphone of FIG. 1.
FIG. 5 is a right side elevational view of the earphone of FIG. 1.
FIG. 6 is a top plan view of the earphone of FIG. 1.
FIG. 7 is a bottom plan view of the earphone of FIG. 1.
FIG. 8 is a perspective view of an alternative embodiment of an earphone showing my new design.
FIG. 9 is a front elevational view of the earphone of FIG. 8.
FIG. 10 is a rear elevational view of the earphone of FIG. 8.
FIG. 11 is a left side elevational view of the earphone of FIG. 8.
FIG. 12 is a right side elevational view of the earphone of FIG. 8.
FIG. 13 is a top plan view of the earphone of FIG. 8; and,
FIG. 14 is a bottom plan view of the earphone of FIG. 8.
Portions of FIGS. 1 to 14 that are shown as broken lines are for illustrative purpose only and form no part of the claimed design.

1 Claim, 14 Drawing Sheets

Figure 1:
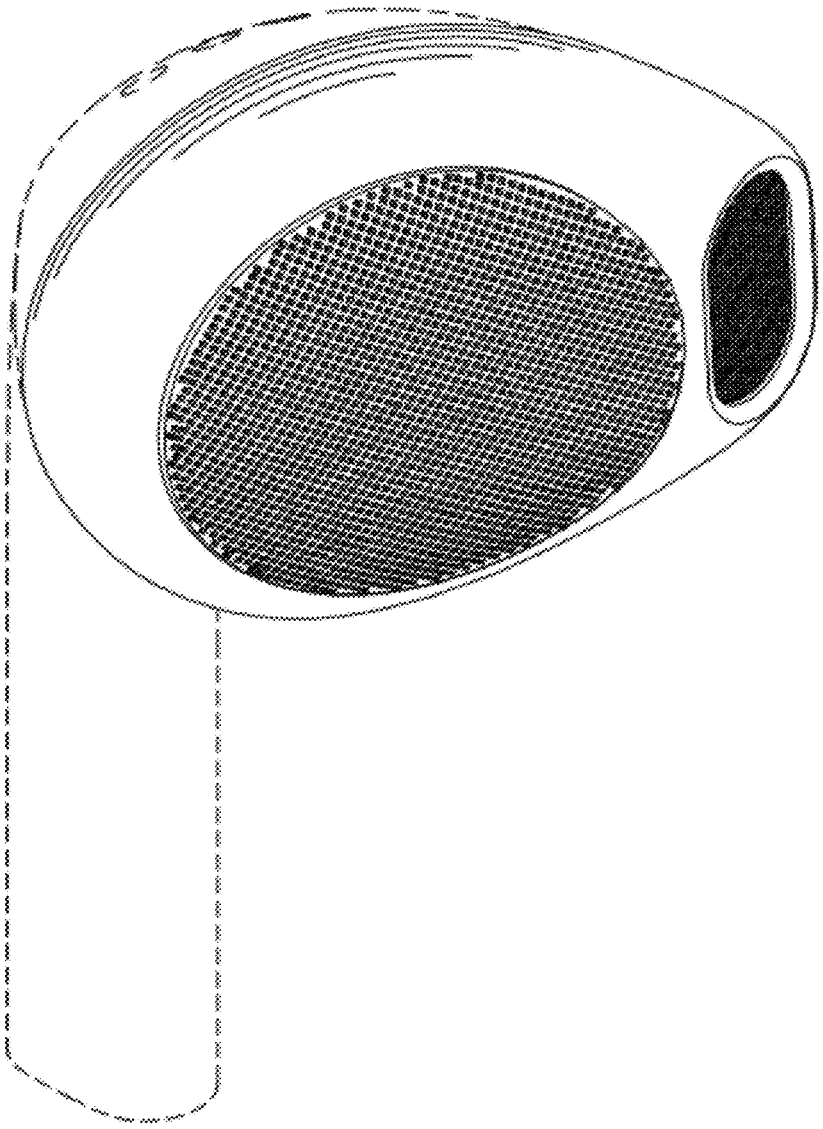
Figure 2:
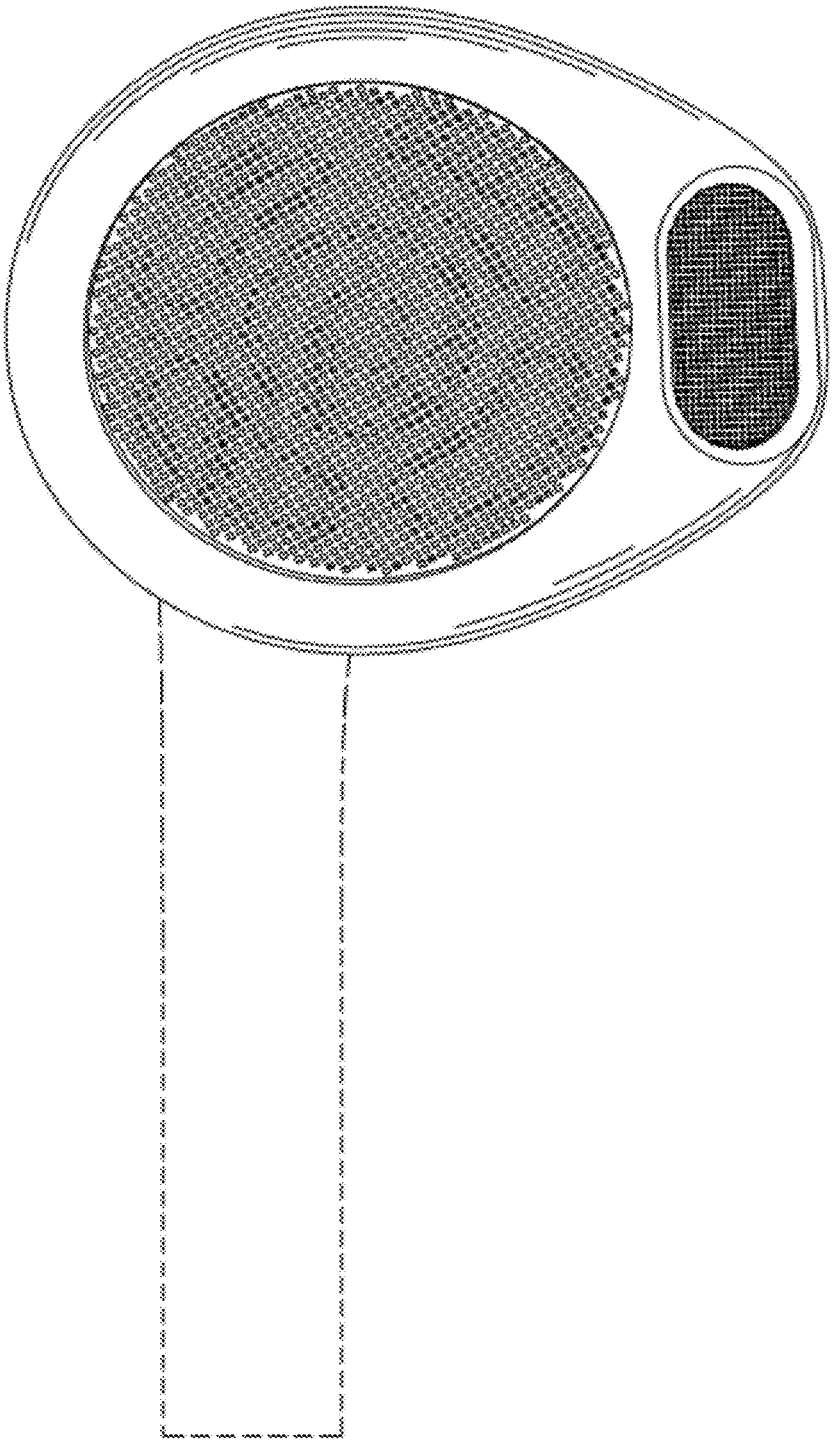
Figure 3:
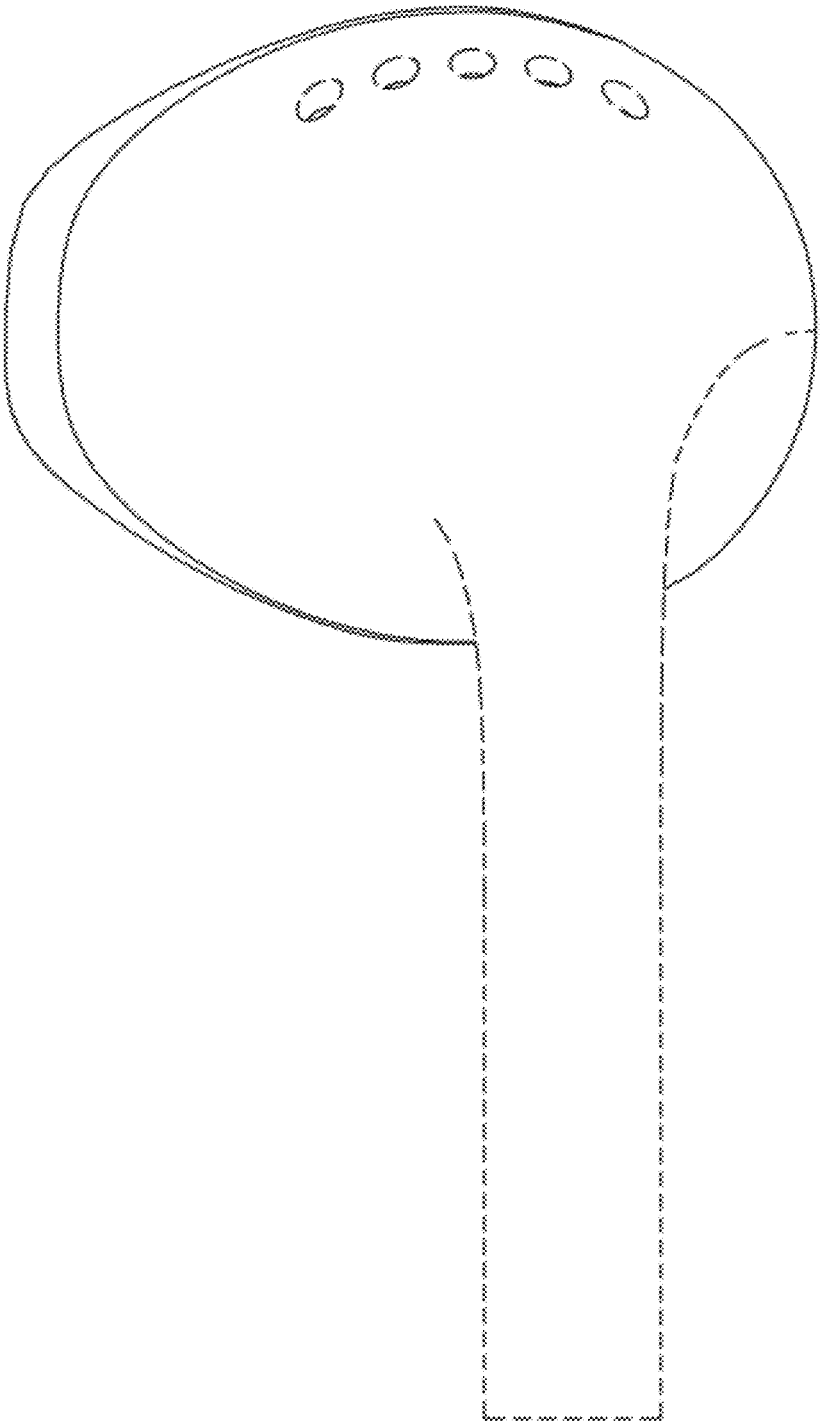
Figure 4:
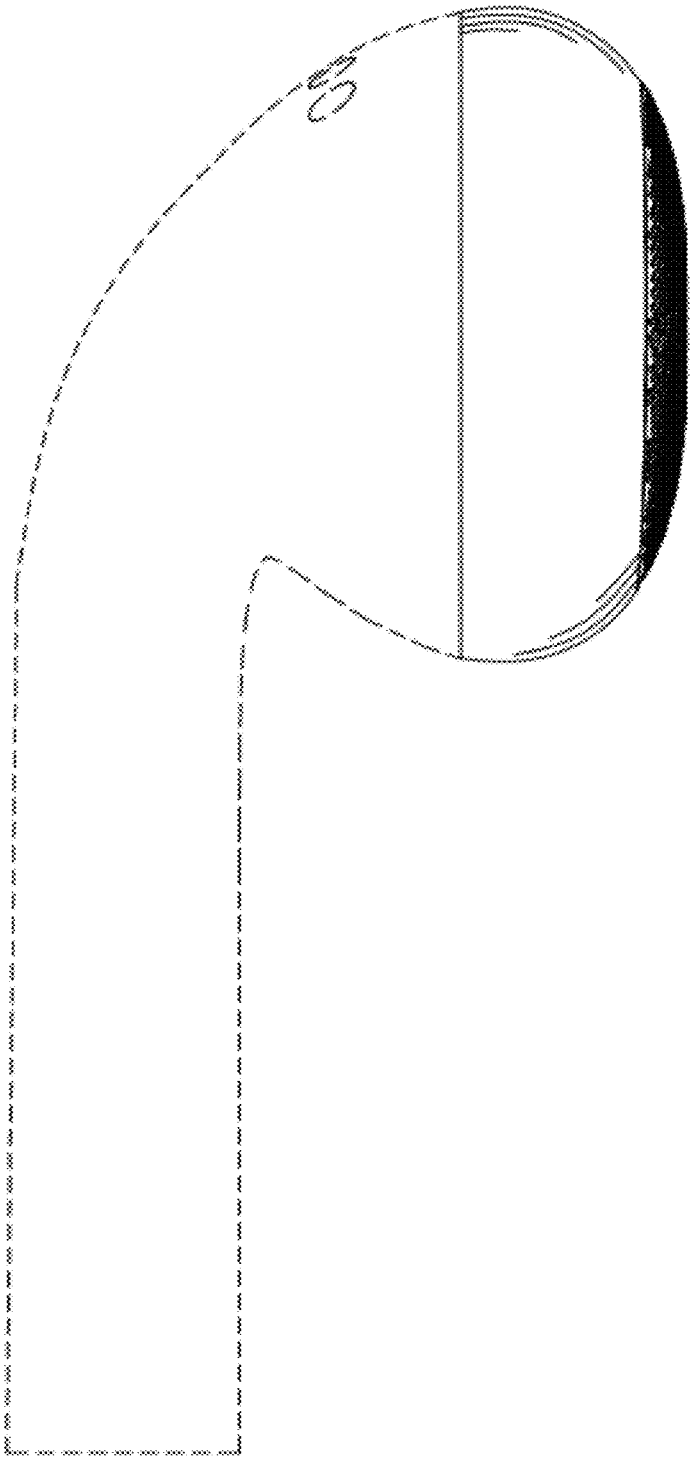
Figure 5:
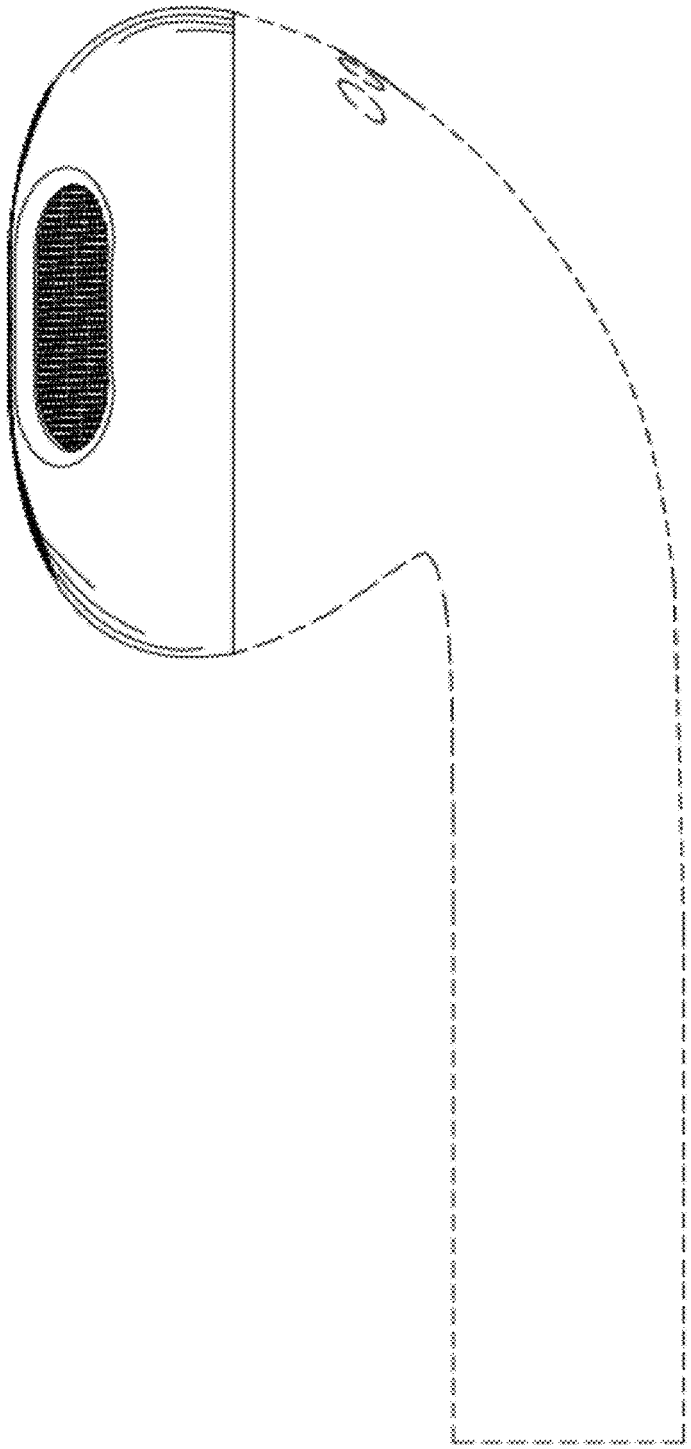
Figure 6:
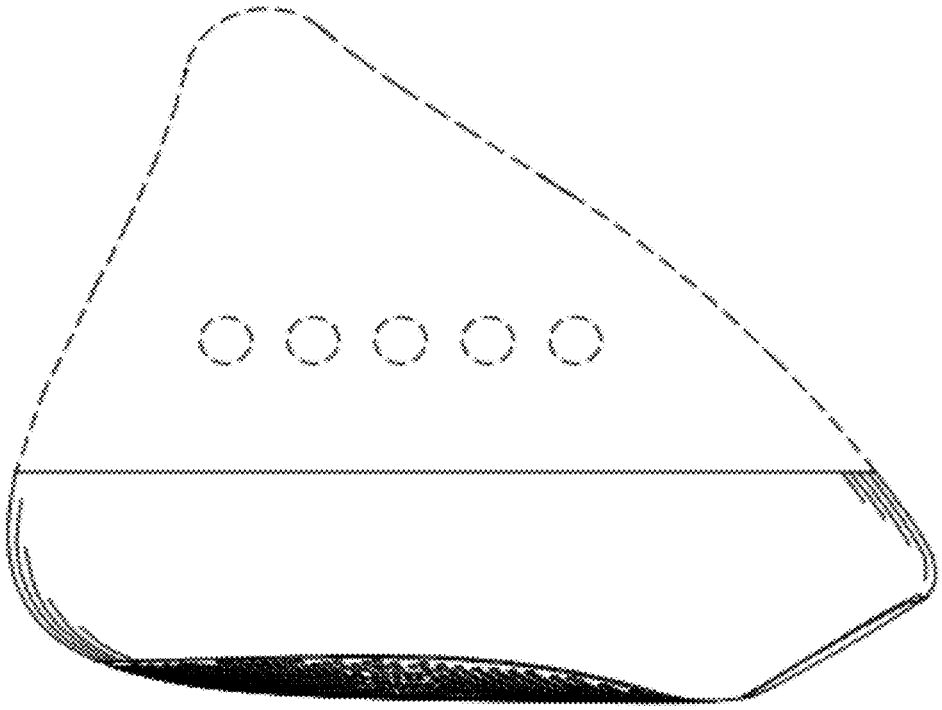
Figure 7:
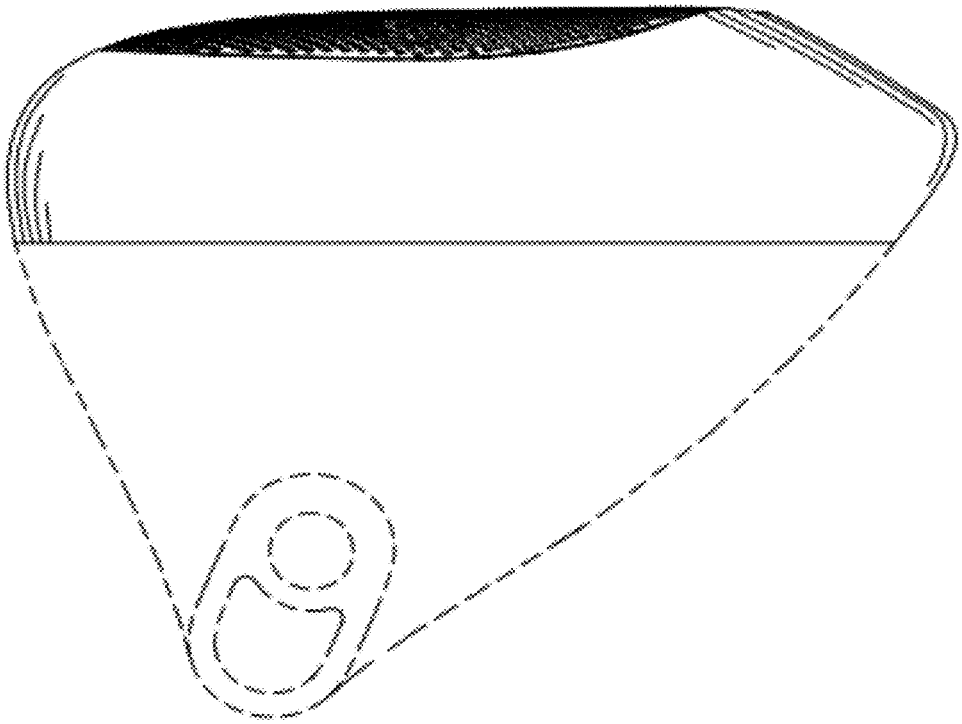
Figure 8:
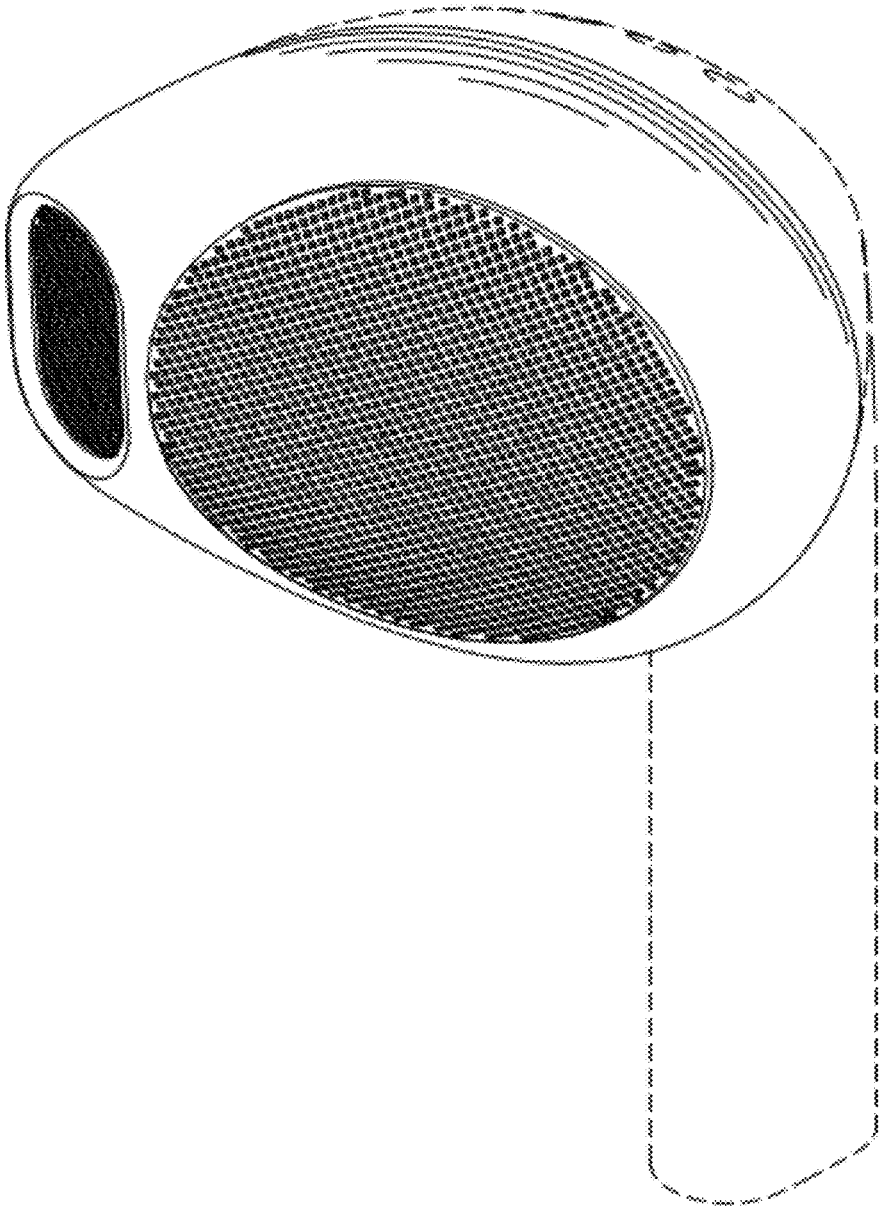
Figure 9:
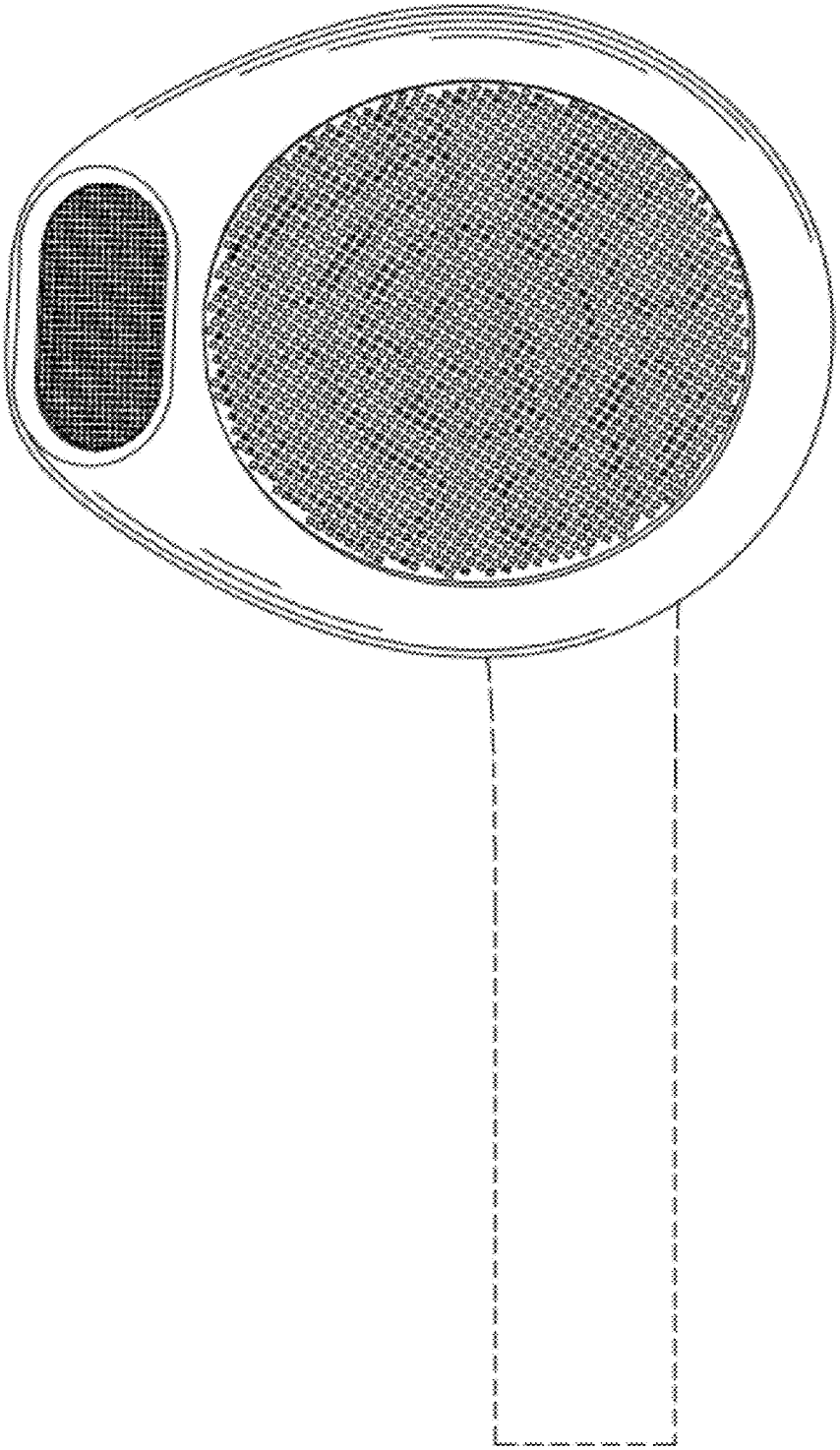
Figure 10:
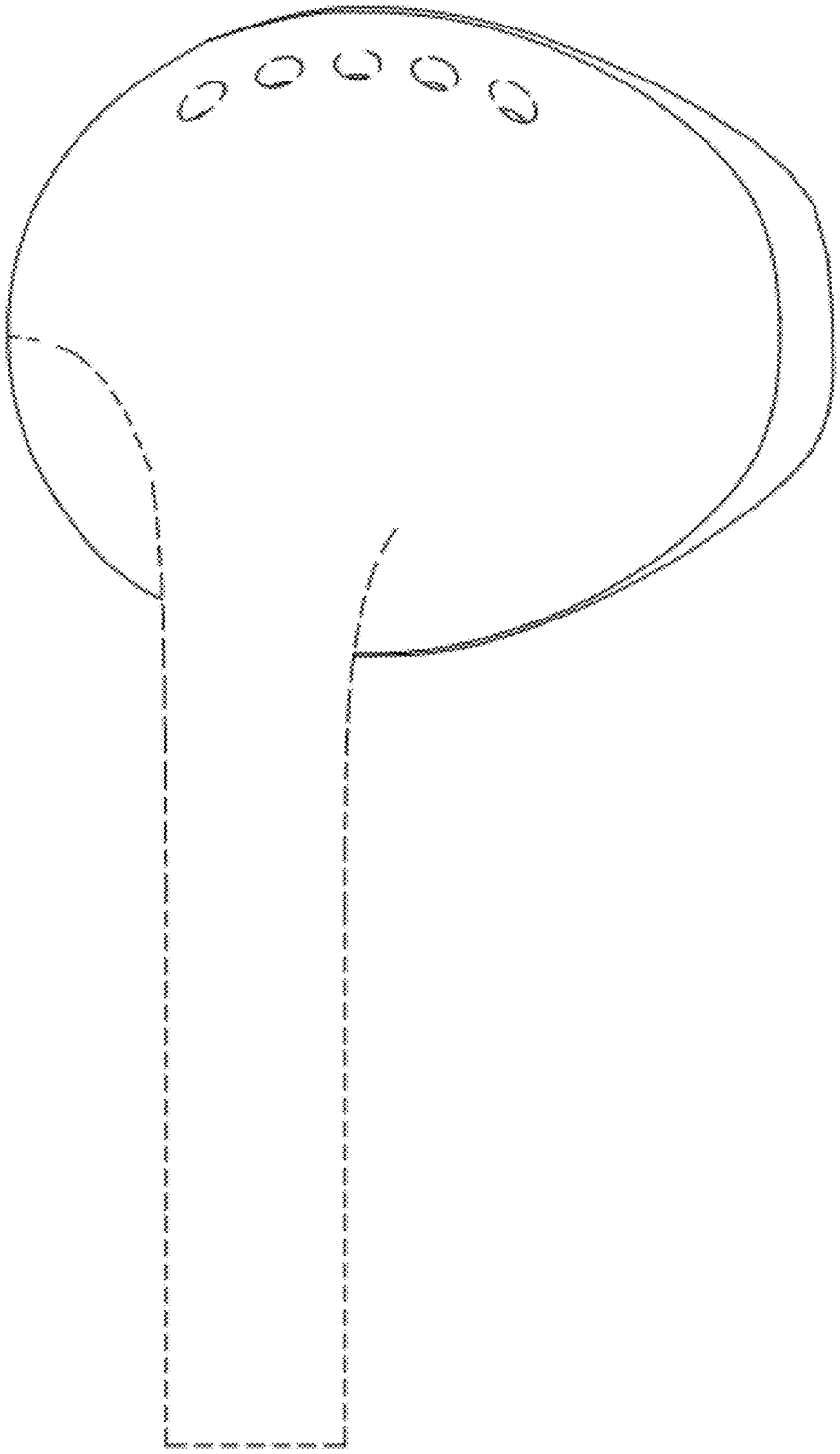
Figure 11:
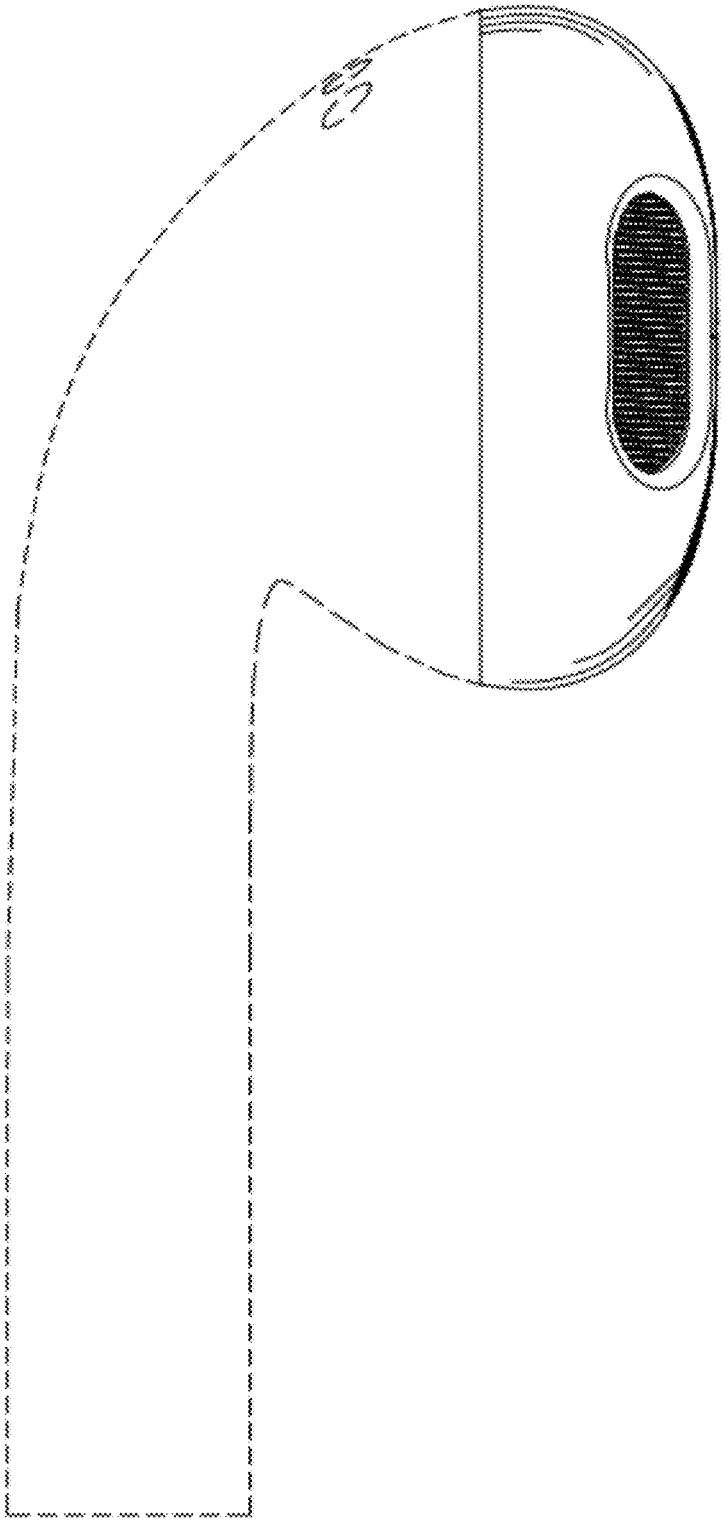
Figure 12:
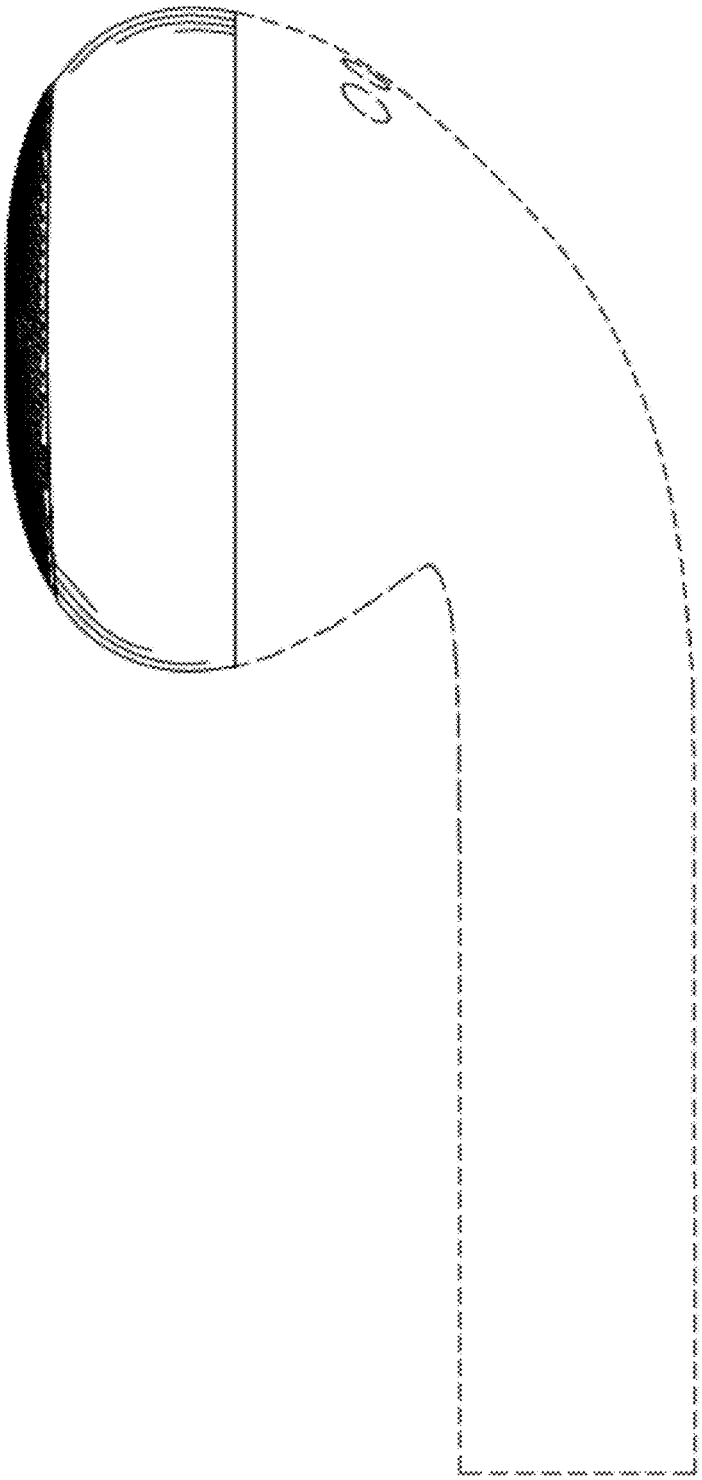
Figure 13:
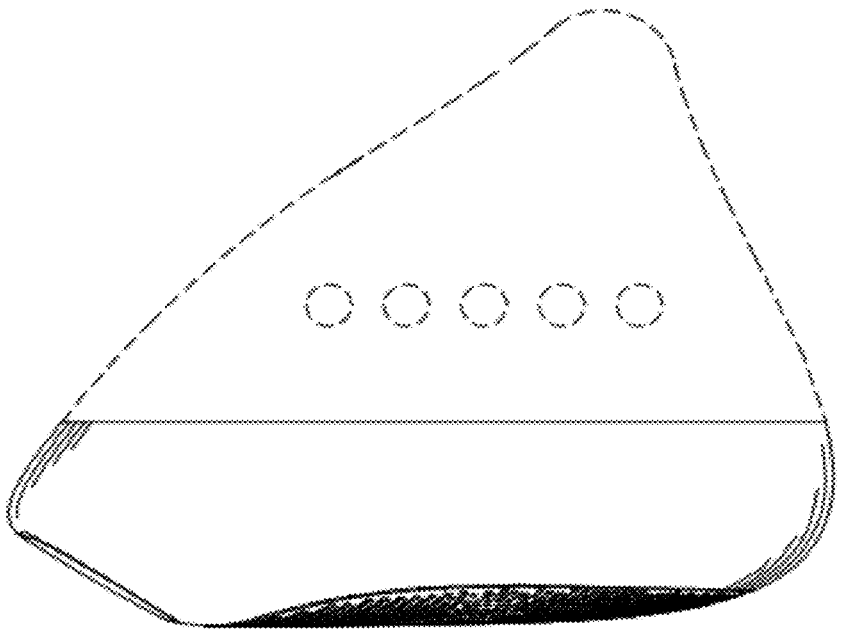
Figure 14:
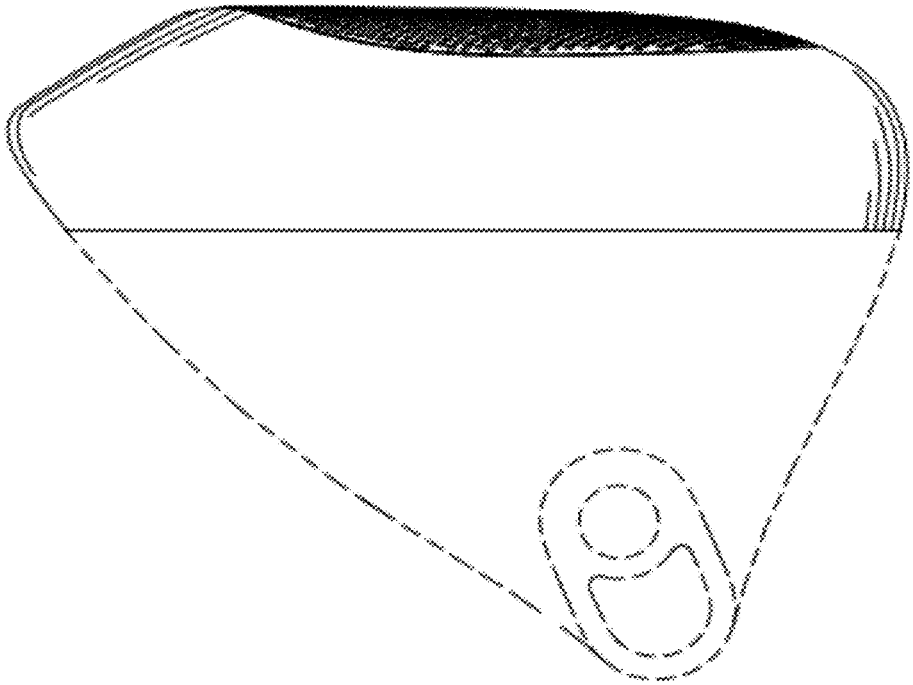

Matter enclosed in heavy brackets [ ] appears in the original patent but forms no part of this reissue; matter printed in italics indicates the additions made by reissue.

(58) Field of Classification Search
CPC ..... H04R 25/00; H04R 1/10; H04R 1/10016; H04R 1/105; H04R 1/1083; H04R 1/02
See application file for complete search history.

(56) References Cited

U.S. PATENT DOCUMENTS 4,646,872 A * 3/1987 Kamon et al. ..... H04R 1/225 181/129
4,965,838 A * 10/1990 Kamon et al. ..... H04R 1/1016 381/380
D318,864 S * 8/1991 Daido et al. ..... D14/205
D318,865 S * 8/1991 Ichikawa ..... D14/205
5,133,428 A * 7/1992 Perrson ..... B60R 11/0217 181/153
D334,043 S * 3/1993 Taniguchi et al. ..... D14/218
5,420,935 A * 5/1995 Shinohara et al. .. H04R 1/1016 381/370
6,122,369 A * 9/2000 Hwang et al. ..... H04M 1/6058 379/420.04
D469,753 S * 2/2003 Andre et al. ..... D14/205
6,560,344 B1 * 5/2003 Julstrom et al. ..... H04R 1/406 381/356
D519,109 S * 4/2006 Perszyk et al. ..... D14/223
D523,846 S * 6/2006 Lee ..... D14/205
D531,169 S * 10/2006 Tokioka et al. ..... D14/223
7,289,640 B2 * 10/2007 Tsai et al. ..... H04M 1/05 379/430
D556,741 S * 12/2007 Yeo ..... D14/205
D593,537 S * 6/2009 Arimoto ..... D14/205
D615,070 S * 5/2010 Andre et al. ..... D14/223
D625,709 S * 10/2010 Yamamoto ..... D14/223
D668,632 S * 10/2012 Enquist ..... D14/205
D669,058 S * 10/2012 Lee ..... D14/223
D681,015 S * 4/2013 Akana ..... H04R 1/1016 D14/223
D691,594 S * 10/2013 Akana ..... D14/223
D715,777 S * 10/2014 Huang ..... D14/223
D726,694 S * 4/2015 Behar ..... D14/223
D730,876 S * 6/2015 Dahlberg ..... D14/223
D733,101 S * 6/2015 Pi ..... D14/223
D733,689 S * 7/2015 Narita ..... D14/223
D744,456 S * 12/2015 Pedersen ..... D14/223
D754,638 S * 4/2016 Krissman ..... D14/223
D757,682 S * 5/2016 Perez ..... D14/205
D770,412 S * 11/2016 Son ..... D14/205
D770,425 S * 11/2016 Son ..... D14/205
D801,314 S * 10/2017 Akana ..... D14/223
D810,047 S * 2/2018 Tzeng ..... D14/205
D813,849 S * 3/2018 Andreen ..... D14/223
D818,990 S * 5/2018 Tzeng ..... D14/205
D820,809 S * 6/2018 Akana ..... D14/205
D830,345 S * 10/2018 Cai ..... D14/223
D847,125 S * 4/2019 Akana ..... D14/223
D849,401 S * 5/2019 Akana ..... D3/274
D853,995 S * 7/2019 Cai ..... D14/223
D861,647 S * 10/2019 Chen ..... D14/223
D862,424 S * 10/2019 You ..... D14/223
D864,166 S * 10/2019 You ..... D14/223
D869,445 S * 12/2019 Hu ..... D14/223

* cited by examiner